United States Patent
Lee et al.

(10) Patent No.: US 8,345,594 B2
(45) Date of Patent: Jan. 1, 2013

(54) METHOD OF EXECUTING HANDOVER BETWEEN HETEROGENEOUS NETWORKS AND METHOD OF SUPPORTING THE SAME

(75) Inventors: Young Dae Lee, Gyeonggi-do (KR); Sung Duck Chun, Gyeonggi-do (KR); Myung Cheul Jung, Seoul (KR); Sung Jun Park, Gyeonggi-do (KR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 12/159,983

(22) PCT Filed: Sep. 14, 2006

(86) PCT No.: PCT/KR2006/003660
§ 371 (c)(1),
(2), (4) Date: Jan. 23, 2009

(87) PCT Pub. No.: WO2007/078043
PCT Pub. Date: Jul. 12, 2007

(65) Prior Publication Data
US 2009/0296653 A1    Dec. 3, 2009

(30) Foreign Application Priority Data
Jan. 6, 2006    (KR) .................. 10-2006-0001911

(51) Int. Cl.
H04W 4/00    (2009.01)
H04W 36/00    (2009.01)
(52) U.S. Cl. ........................................ 370/328; 370/331
(58) Field of Classification Search .................. None
See application file for complete search history.

(56) References Cited

U.S. PATENT DOCUMENTS
7,224,977 B2 * 5/2007 Cavalli et al. .............. 455/452.1
(Continued)

FOREIGN PATENT DOCUMENTS
EP    1503606 A1    2/2005
(Continued)

OTHER PUBLICATIONS

Murray K and Pesch D.: "Policy Based Access Management and Handover Control in Heterogeneous Wireless Networks", 26-29. (Sep. 26-29, 2004), XP10787490A.

*Primary Examiner* — Chirag Shah
*Assistant Examiner* — Srinivasa Reddivalam
(74) *Attorney, Agent, or Firm* — Lee, Hong, Degerman, Kang & Waimey (57) ABSTRACT

A method of executing a handover between heterogeneous networks and method of supporting the same are disclosed, by which the handover can be smoothly performed between a wireless mobile communication network and a wireless LAN. A method of executing a handover between heterogeneous networks, in which a user equipment communicating with a wireless mobile communication network performs the handover into a wireless LAN, includes the steps of making a request for information for at least one cell neighbor to the wireless LAN to a second mobile communication network node via a first mobile communication network node, receiving the information for the at least one cell via the first mobile communication network node from the second mobile communication network node, and executing the handover to the wireless LAN using the received information.

6 Claims, 6 Drawing Sheets

U.S. PATENT DOCUMENTS

| | | | |
|---|---|---|---|
| 2004/0156332 A1 | 8/2004 | Terry et al. | |
| 2005/0026616 A1* | 2/2005 | Cavalli et al. | 455/436 |
| 2005/0210154 A1* | 9/2005 | Verma et al. | 709/249 |
| 2006/0194582 A1* | 8/2006 | Cooper | 455/436 |
| 2007/0099664 A1* | 5/2007 | Hwang | 455/560 |
| 2008/0205345 A1* | 8/2008 | Sachs et al. | 370/332 |

FOREIGN PATENT DOCUMENTS

| | | |
|---|---|---|
| EP | 1524806 A2 | 4/2005 |
| EP | 1549089 A1 | 6/2005 |
| KR | 1020040106277 | 12/2004 |
| WO | WO 0135586 A1 * | 5/2001 |

* cited by examiner

METHOD OF EXECUTING HANDOVER BETWEEN HETEROGENEOUS NETWORKS AND METHOD OF SUPPORTING THE SAME

CROSS-REFERENCE TO RELATED APPLICATIONS

This application is the National Stage filing under 35 U.S.C. 371 of International Application No. PCT/KR2006/003660, filed on Sep. 14, 2006, which claims the benefit of earlier filing date and right of priority of Korean Application No. 10-2006-0001911, filed on Jan. 6, 2006.

TECHNICAL FIELD

The present invention relates to a wireless mobile communication system, and more particularly, to a method of executing a handover between heterogeneous networks and method of supporting the same. Although the present invention is suitable for a wide scope of applications, it is particularly suitable for the handover between a wireless mobile communication network and a wireless LAN.

BACKGROUND ART

Figure 1:
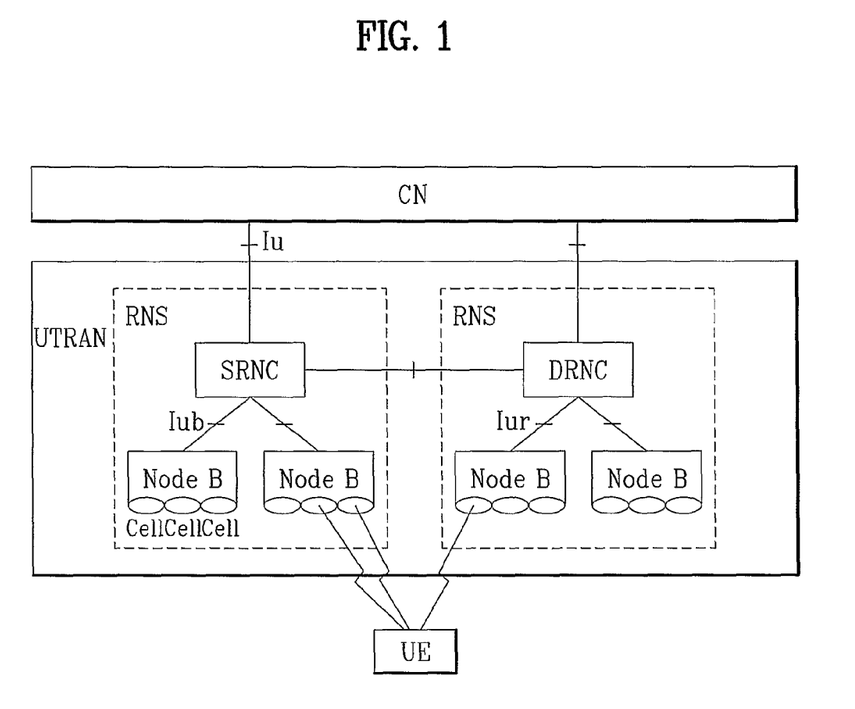
FIG. 1 is a block diagram of a network structure of UMTS (universal mobile telecommunications system)

FIG. 1 is a block diagram of a network structure of UMTS (universal mobile telecommunications system).

Referring to FIG. 1, a universal mobile telecommunications system (hereinafter abbreviated UMTS) mainly includes a user equipment (hereinafter abbreviated UE), a UMTS terrestrial radio access network (hereinafter abbreviated UTRAN), and a core network (hereinafter abbreviated CN).

The UTRAN includes at least one radio network sub-system (hereinafter abbreviated RNS). And, the RNS includes one radio network controller (hereinafter abbreviated RNC) and at least one base station (hereinafter called Node B) managed by the RNC. And, at least one or more cells exist in one Node B.

An interface between RNCs is called Iur interface and another interface between RNC and Node B is called Iub interface. And, another interface between RNC and CN is called Iu interface.

Meanwhile, RNC responsible for a major function of controlling one user equipment (UE) is called SRNC (serving RNC) of the corresponding UE. And, another RNC, which is not responsible for the major function of controlling the corresponding UE but provides radio resources for the UE, is called DRNC (drift RNC) of the corresponding UE.

A protocol responsible for control message exchange between SRNC and DRNC is called RNSAP (radio network subsystem application part) and a protocol responsible for control message exchange between RNC and Node B is called NBAP (Node B application part).

Figure 2:
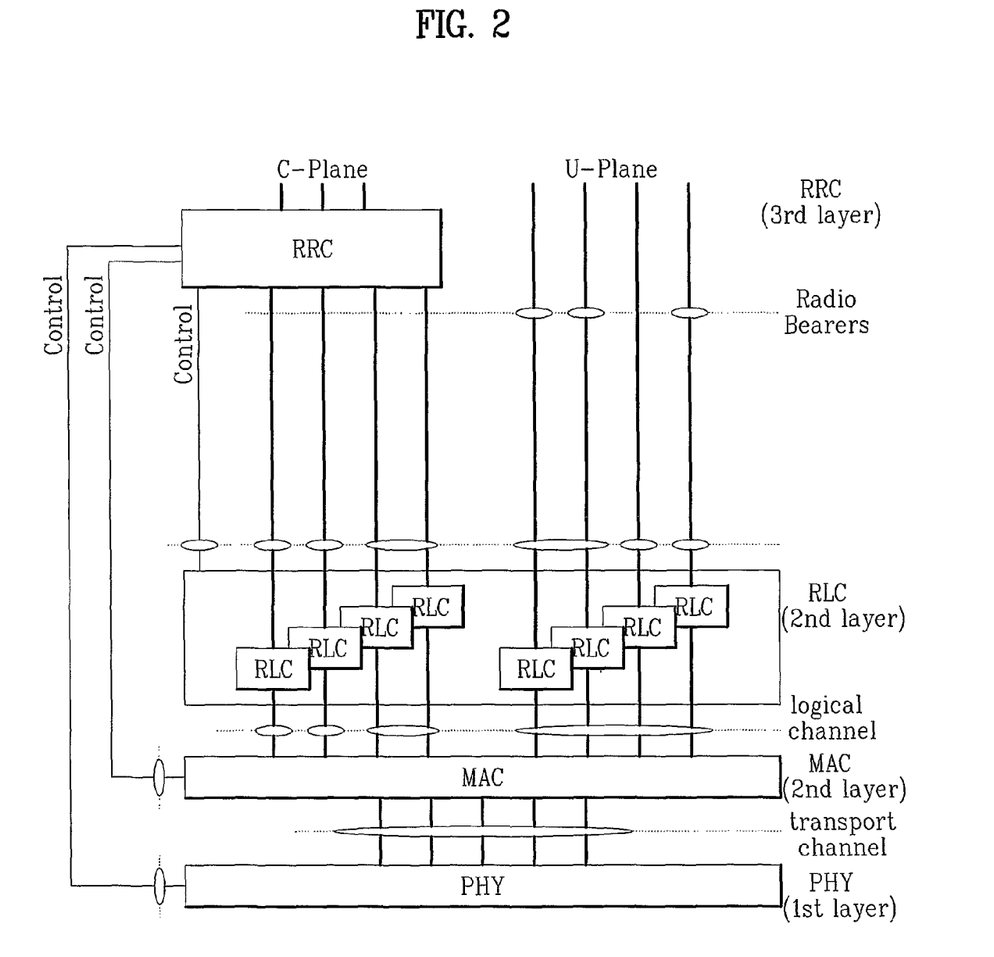
FIG. 2 is an architectural diagram of a radio interface protocol between UE (user equipment) and UTRAN (UMTS terrestrial radio access network) based on the 3GPP radio access network standard.

FIG. 2 is an architectural diagram of a radio interface protocol between UE (user equipment) and UTRAN (UMTS terrestrial radio access network) based on the 3GPP radio access network standard.

Referring to FIG. 2, a radio interface protocol vertically includes a physical layer, a data link layer, and a network layer and horizontally includes a user plane for data information transfer and a control plane for signaling transfer.

The protocol layers in FIG. 2 can be divided into L1 (first layer), L2 (second layer), and L3 (third layer) based on three lower layers of the open system interconnection (OSI) standard model widely known in the communications systems.

The respective layers in FIG. 2 are explained as follows.

First of all, the physical layer (hereinafter named PHY) as the first layer offers an information transfer service to an upper layer using a physical channel. The physical layer PHY is connected to a medium access control (hereinafter abbreviated MAC) layer above the physical layer PHY via a transport channel. And, data are transferred between the medium access control layer MAC and the physical layer PHY via the transport channel. Moreover, data are transferred between different physical layers, and more particularly, between one physical layer of a transmitting side and the other physical layer of a receiving side via the physical channel.

The medium access control (hereinafter abbreviated MAC) layer of the second layer offers a service to a radio link control layer above the MAC layer via a logical channel.

The radio link control (hereinafter abbreviated RLC) layer of the second layer supports reliable data transfer and is operative in segmentation and concatenation of RLC service data units sent down from an upper layer. Hereinafter, the service data unit will be abbreviated SDU.

A radio resource control (hereinafter abbreviated 'RRC') layer located on a lowest part of the third layer is defined in the control plane only and is associated with configuration, reconfiguration and release of radio bearers to be in charge of controlling the logical, transport and physical channels (hereinafter, the radio bearer will be abbreviated RB).

In this case, the RB means a service offered by the second layer for the data transfer between the UE and the UTRAN. And, the configuration of RB means a process of regulating characteristics of protocol layers and channels necessary for offering a specific service and a process of setting their specific parameters and operational methods, respectively.

If an RRC layer of a specific UE and an RRC layer of UTRAN are connected together to exchange an RRC message, the corresponding UE is in a connected state. If not, the corresponding UE is in an idle state.

A generic access network (hereinafter abbreviated GAN) is explained as follows.

First of all, GAN can be called UMA (unlicensed mobile access) and is a system that supports seamless roaming between a UTRAN and a wireless LAN. And, GAN UE which supports the UTRAN and the wireless LAN by supporting the GAN is able to switch to the wireless LAN without access interruption in moving away into an area having a weak UTRAN signal and a strong wireless LAN signal. For this, a network supports GANC (GAN controller).

However, in the related art, a clear procedure for executing handover between heterogeneous networks has not been defined. And, the DRNC of the related art is unable to know whether a specific UE is able to support the GAN. So, the UTRAN is unable to know whether to inform the corresponding UE of information for GAN cell near a cell controlled by the DRNC. If the DRNC is unable to know this fact, the DRNC should give the information for the GAN cell to all UEs. Hence, signaling overhead is generated in the RRC interface and network interface.

DISCLOSURE OF THE INVENTION

Accordingly, the present invention is directed to a method of executing a handover between heterogeneous networks and method of supporting the same that substantially obviate one or more of the problems due to limitations and disadvantages of the related art.

An object of the present invention is to provide a method of executing a handover between heterogeneous networks and method of supporting the same, by which the handover can be smoothly performed between a wireless mobile communication network and a wireless LAN.

Another object of the present invention is to provide a method of executing a handover between heterogeneous networks and method of supporting the same, by which signaling overhead for the execution of the handover between heterogeneous networks can be reduced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of executing a handover between heterogeneous networks, in which a user equipment communicating with a wireless mobile communication network performs the handover into a wireless LAN, according to the present invention includes the steps of making a request for information for at least one cell neighbor to the wireless LAN to a second mobile communication network node via a first mobile communication network node, receiving the information for the at least one cell via the first mobile communication network node from the second mobile communication network node, and executing the handover to the wireless LAN using the received information.

To further achieve these and other advantages and in accordance with the purpose of the present invention, a method of executing a handover between heterogeneous networks, in which a user equipment communicating with a wireless mobile communication network performs the handover into a wireless LAN, includes the steps of transmitting information indicating whether an access to the wireless LAN is available to a first mobile communication network node, receiving information for a neighbor wireless LAN cell from the first mobile communication network node wherein the information for the neighbor wireless LAN cell is delivered to the first mobile communication network node from a second mobile communication network node, and executing the handover to the wireless LAN using the received information for the neighbor wireless LAN cell.

To further achieve these and other advantages and in accordance with the purpose of the present invention, a method of supporting a handover between heterogeneous networks, in which the handover from a wireless mobile communication network to a wireless LAN is supported by a first mobile communication network of the wireless mobile communication network, includes the steps of receiving information indicating whether an access to the wireless LAN is available from a user equipment, transmitting a first message requesting information for at least one neighbor cell of the wireless LAN to a second mobile communication network node, receiving the information for the at least one neighbor cell delivered from the second mobile communication network node, and transmitting the information for the at least one neighbor cell to the user equipment.

Preferably, the first message includes information indicating whether the user equipment is able to access the wireless LAN.

Preferably, the first message includes information indicating whether the first mobile communication network node supports a function of accessing the wireless LAN.

Preferably, the first mobile communication network node is a serving radio network controller (SRNC).

More preferably, the second mobile communication network node is a drift radio network controller (DRNC).

In order to prevent the generation of radio signaling overhead, the present invention is characterized in that a UE informs DRNC via SRNC whether the UE is able to support GAN and that the DRNC informs a specific UE of information for a GAN cell via the SRNC if the specific UE is capable of supporting the GAN.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 3:
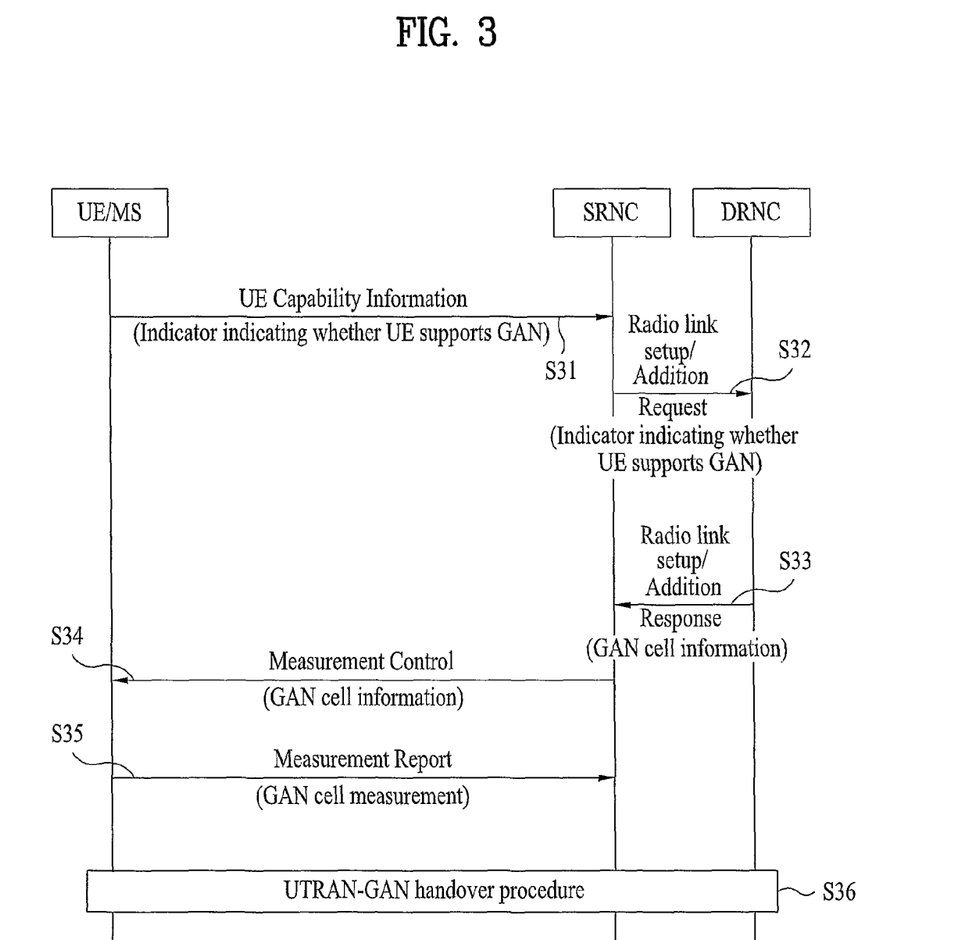
FIGS. 3 to 5 are flowcharts of methods according to preferred embodiments of the present invention, respectively.

FIG. 3 is a flowchart of a method according to a preferred embodiment of the present invention.

Referring to FIG. 3, a UE (Mobile Station) transmits UE capability information containing a GAN support indicator that indicates whether GAN is supported to an SRNC (S31).

The SRNC then transmits a radio link setup request message indicating the GAN support indicator of the UE or a radio link addition request message to a DRNC (S32).

In case that the GAN support indicator of the UE indicates that the UE supports the GAN, the DRNC delivers information of GAN cells located neighbor to the UE to the SRNC using a radio link setup response message or a radio link addition response message (S33).

If the SRNC supports the GAN, the SRNC is able to recognize a non-critical extension part of the message. If not, the SRNC may not be able to recognize the non-critical extension part.

Subsequently, the SRNC informs the UE of information of the GAN cells received from the DRNC via a measurement control message (S34).

Using the received information of the GAN cells, the UE measures power of each of the GAN cells and then transmits a measurement report message including information of the corresponding GAN cell having the highest power to a UTRAN (S35). In particular, the UE transmits the measurement report message, in which GAN cell information is included, used in reporting a measurement result of at least one neighbor cell to the UTRAN. In doing so, the UE reports to the UTRAN via the GAN cell information that a reception power of the corresponding GAN cell is currently in a highest state among reception powers of the entire GAN cells. In this case, the GAN cell means a cell of a wireless LAN.

Having received the measurement report message, the UTRAN executes a UTRAN-to-GAN handover procedure (S36). In particular, the UTRAN executes the UTRAN-to-GAN handover procedure to enable the UE to move away into the GAN cell using the measurement report message having been transmitted by the UE.

In this procedure, the UTRAN makes a request of handover to the GAN cell to a CN. The CN then forwards the request of the handover to the GAN cell to a GANC. If the GANC accepts the handover request, the UTRAN transmits 'Handover From UTRAN Command' message commanding a handover to the GAN cell to the UE.

Subsequently, the GANC exchanges a message with the GANC to complete the handover to the GAN cell.

In brief, the UTRAN including the SRNC and the DRNC provides GAN cell information to the UE. In particular, information for a wireless LAN system as a heterogeneous network of the UTRAN is provided by the UTRAN. And, the GAN cell information provided to the UE is provided not by the SRNC but by the DRNC.

Figure 4:
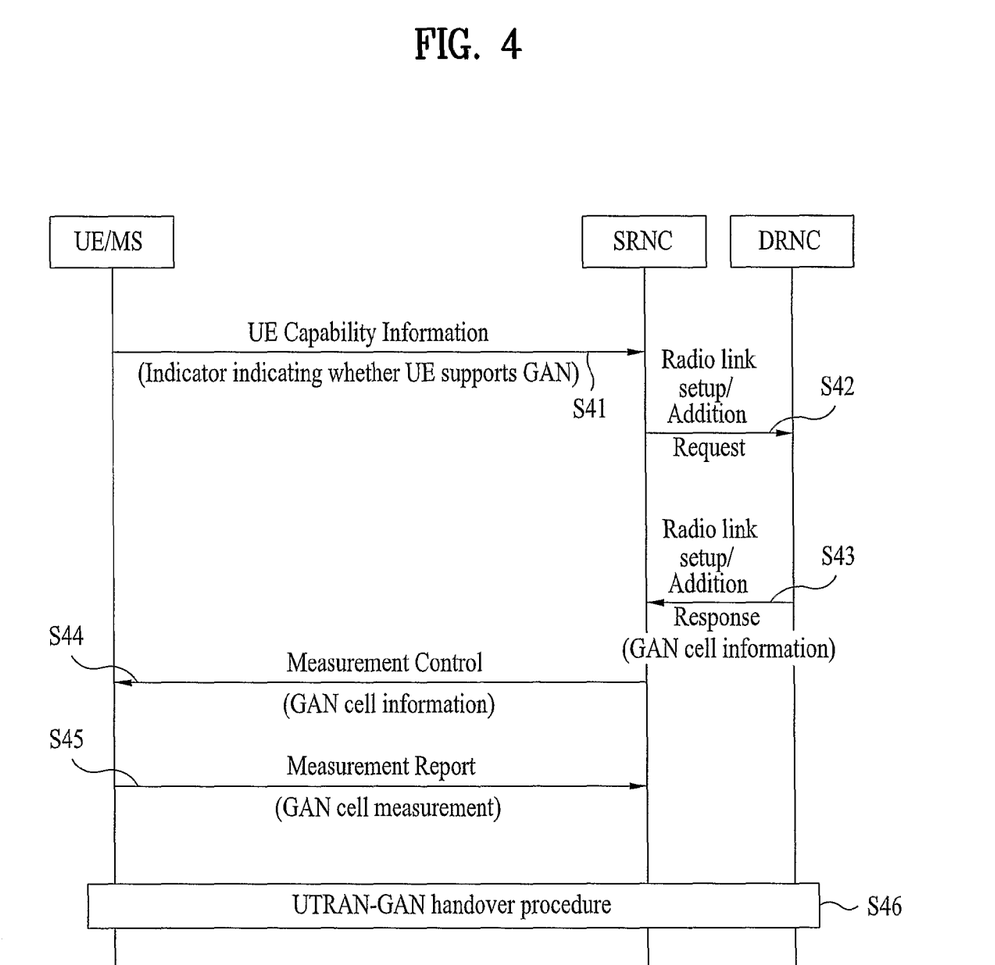

FIG. 4 is a flowchart of a method according to another preferred embodiment of the present invention.

Referring to FIG. 4, a UE transmits UE capability information containing a GAN support indicator that indicates whether GAN is supported to an SRNC (S41).

The SRNC then transmits a radio link setup request message indicating the GAN support indicator of the UE or a radio link addition request message to a DRNC (S42). Yet, unlike the former embodiment shown in FIG. 3, a UE's GAN support indicator is not included.

The DRNC transmits a radio link setup response message or a radio link addition response message to the SRNC by including information of GAN cells neighbor to the UE (S43). In this case, the information for the neighbor GAN cells is preferably transmitted via a non-critical extension part of the message.

If the SRNC supports the GAN, the SRNC is able to recognize the non-critical extension part of the message. If not, the SRNC may not be able to recognize the non-critical extension part.

If the SRNC obtains the information of the GAN cells by recognizing the non-critical extension part and if the SRNC decides that the GAN is necessary or if the UE is capable of supporting the GAN, the SRNC informs the UE of information of the GAN cells received from the DRNC via a measurement control message (S44). And, subsequent steps of the present embodiment are identical to those of the former embodiment shown in FIG. 3.

In brief, like the former example shown in FIG. 3, in the example shown in FIG. 4, the UTRAN including the SRNC and the DRNC provides GAN cell information to the UE. In particular, information for a wireless LAN system as a heterogeneous network of the UTRAN is provided by the UTRAN. And, like the former example shown in FIG. 3, the GAN cell information provided to the UE is provided not by the SRNC but by the DRNC.

Yet, in the example shown in FIG. 4, the SRNC is able to perform its operation regardless of a presence or non-presence of GAN support by the UE. In particular, it is preferable that the SRNC shown in FIG. 4 transmits a radio link setup/addition message regardless of a presence or non-presence of GAN support by the UE. In this case, it is more preferable that the DRNC shown in FIG. 4 transmits the GAN cell information to the SRNC regardless of a presence or non-presence of GAN support by the UE.

On the other hand, it is preferable that the SRNC shown in FIG. 3 performs its operation by considering a presence or non-presence of GAN support by the UE. In particular, if the UE supports GAN, the SRNC shown in FIG. 3 more preferably performs the procedure shown in FIG. 3. And, the DRNC shown in FIG. 3 confirms a presence or non-presence of GAN support by the UE and is then able to transmit corresponding GAN cell information to the SRNC.

Figure 5:
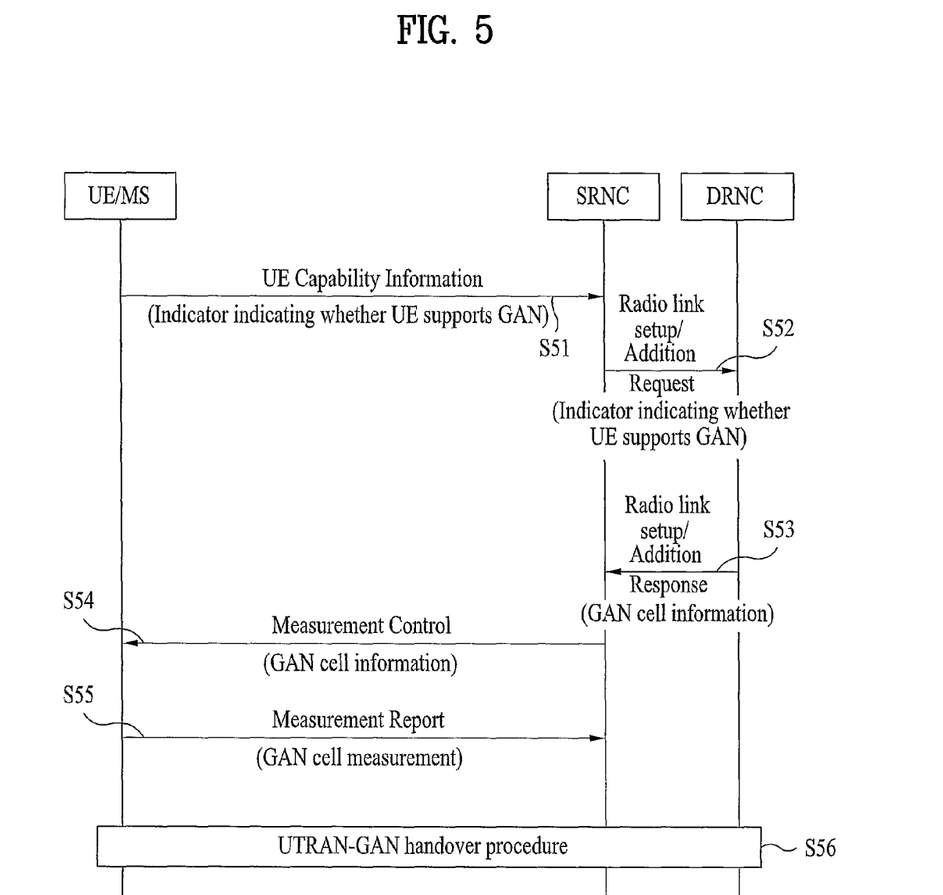

FIG. 5 is a flowchart of a method according to another preferred embodiment of the present invention.

Referring to FIG. 5, a UE (MS) transmits UE capability information containing a GAN support indicator that indicates whether GAN is supported to an SRNC (S51).

The SRNC informs the DRNC whether the SRNC itself supports GAN (S52). In this case, a radio link setup request message or a radio link addition request message can be used.

If the SRNC supports the GAN, the DRNC informs the SRNC of information for GAN cells neighbor to the UE (S53). If the SRNC does not support the GAN, the DRNC does not inform the SRNC of the information for GAN cells neighbor to the UE. In this case, a radio link setup request message or a radio link addition request message can be used.

If the SRNC decides that the GAN is necessary or if the UE is capable of supporting the GAN, the SRNC informs the UE of information of the GAN cells received from the DRNC via a measurement control message (S54). And, subsequent steps of the present embodiment are identical to those of the former embodiment shown in FIG. 3 or FIG. 4.

The example shown in FIG. 5 differs from the former example shown in FIG. 4 or FIG. 3 as follows.

First of all, in the example shown in FIG. 5, operations can be performed according to the presence or non-presence of the GAN support by the SRNC. In particular, it is preferable that the operations of the step S52 and the following steps are performed according to whether the SRNC shown in FIG. 5 supports the GAN. If the SRNC shown in FIG. 5 supports the GAN, it is more preferable that the DRNC shown in FIG. 5 provides the GAN cell information. Namely, the example shown in FIG. 5 relates to a communication method that considers the presence or non-presence of the GAN support by the SRNC.

Compared to this, the example shown in FIG. 4 relates to a method of transmitting the GAN cell information to the SRNC regardless of the presence or non-presence of the GAN support by the UE or the SRNC.

And, since the example shown in FIG. 3 relates to a communication method that considers the presence or non-presence of the GAN support by the UE, the example of FIG. 5 which considers the presence or non-presence of the GAN support by the SRNC differs from the example of FIG. 3.

The information of the GAN cells, which is notified to the SRNC by the DRNC in common in the embodiments shown in FIGS. 3 to 5, i.e., the GAN cell information is transmitted by being included in 'Neighboring GSM Cell Information' as an information element included in the radio link setup response message or the radio link addition response message, 'Neighboring GAN Cell Information' as a new information element or the non-critical extension part.

In case that the GAN cell information is transmitted via 'Neighboring GSM Cell Information', the SRNC is unable to know whether a specific GSM cell is a GAN cell or not in general. So, in order to help the SRNC know it, an indicator indicating that a specific GSM cell is a GAN cell can be included in the information element.

In common to the embodiments shown in FIGS. 3 to 5, the UE capability information can be delivered to the SRNC via such an RRC message as an RRC connection setup complete message (RRC CONNECTION SETUP COMPLETE) or a UE capability information message (UE CAPABILITY INFORMATION) and the like.

In common to the embodiments shown in FIGS. 3 to 5, the SRNC confirms the GAN cell information among a plurality of neighbor cell informations received via the radio link setup response message or the radio link addition response message. If the UE supports the GAN, the SRNC transmits the GAN cell information to the UE. If the UE does not support the GAN, the SRNC does not transmit the GAN cell information to the UE.

The present invention, which is described for a mobile communication system, is applicable to a wireless communication system for a wireless communication system for a PDA or a laptop computer loaded with a wireless communication function. Terminologies for the description of the present invention are not limited to a range of a wireless communication system such as UMTS. And, the present invention is applicable to a wireless communication system, which employs a different radio interface and physical layer, such as TDMA, CDMA, FDMA and the like.

And, contents of the present invention can be implemented as a result of software, firmware, hardware or a combination thereof. In particular, contents of the present invention are implemented using hardware logic such as code, circuit chip and ASIC in hardware or implemented as codes in a computer-readable storage medium such as a hard disc, a floppy disc and a tape, an optical storage, a ROM and a RAM.

The codes stored in the computer-readable storage medium are accessible and executable by a processor. And, the codes implementing the contents of the present invention are accessible via a transmission medium or a file server on a network. In this case, a device for the implementation of the codes is configured to include a wire transmission medium such as a network transmission line, a wireless transmission medium, signal transmission, radio signals, infrared signals and the like.

Figure 6:
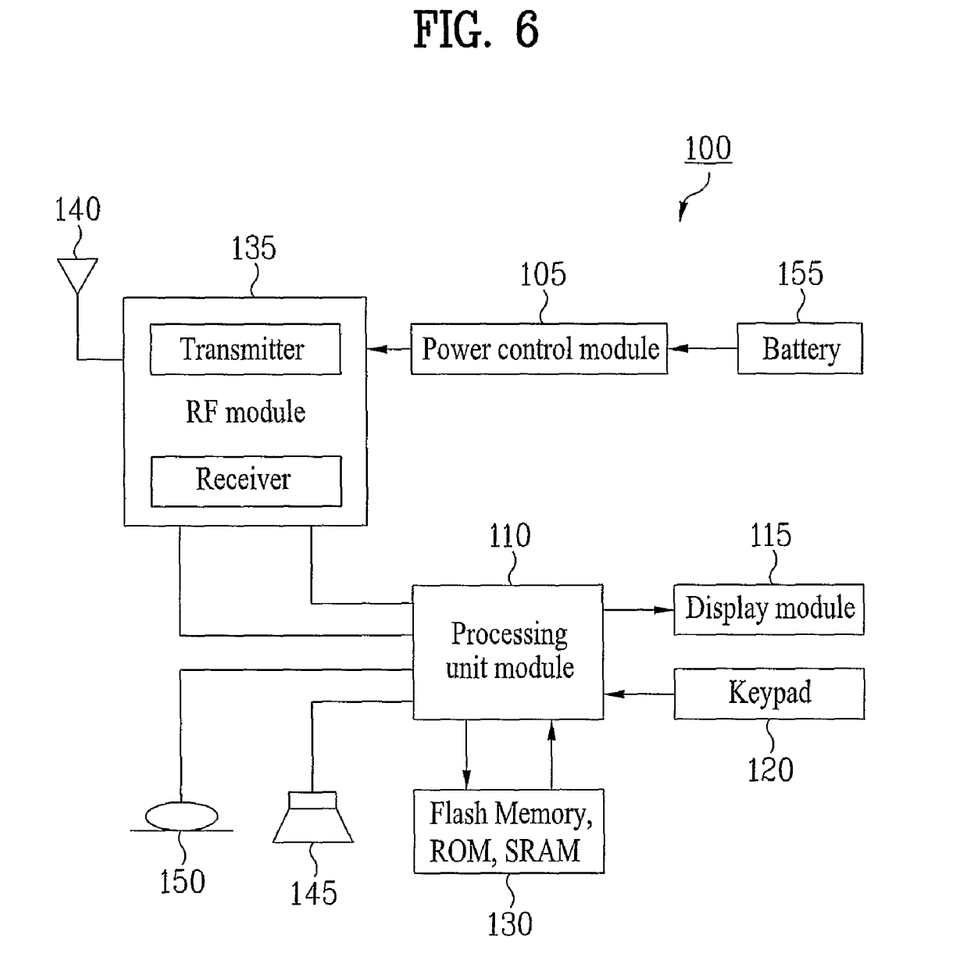
FIG. 6 is a block diagram of a wireless communication apparatus such as a mobile terminal performing functions of the present invention.

FIG. 6 is a block diagram of a wireless communication apparatus such as a mobile terminal performing functions of the present invention.

Referring to FIG. 6, a wireless communication apparatus 100 includes a processing unit module 110 such as a microprocessor, a digital processor and the like, an RF module 135, a power control module 106, an antenna 140, a battery 155, a display module 115, a keypad 120, a storage module 130 such as a ROM, a RAM, a flash memory and the like, a speaker 145 and a microphone 150.

By pressing a button of the keypad 120, a user inputs command information such as a phone number and the like or activates audio using the microphone 145.

The processing unit module 110 receives to process the command information to perform a function requested by the user. And, the processing unit module 110 searches the storage module 130 for data necessary for the execution of the function. Moreover, the processing unit module 110 displays the user's command information and the data searched from the storage module 130 on the display module 115 for user's convenience.

The processing unit module 110 delivers the command information to the RF module 135 to transmit a radio signal including audio communication data.

The RF module 135 includes a transmitter and a receiver to transmit/receive the radio signal. And, the radio signal is finally transmitted/received via the antenna.

In case of receiving the radio signal, the RF module 135 converts the received radio signal to a baseband frequency to enable the radio signal to be processed by the processing unit module 110. And, the converted signal is delivered via the speaker 145 or as readable information.

The RF module 135 is used in receiving data from a network or transmitting information measured or generated by the wireless communication apparatus to the network.

The storage module 130 is used in storing the information measured or generated by the wireless communication apparatus.

And, the processing unit module 110 is properly used for the wireless communication apparatus in receiving the data, processing the received data and transmitting the processed data.

The processing unit module 110 is able to obtain the GAN cell information from the SRNC by controlling the RF module 135. As mentioned in the foregoing description, it is more preferable that the GAN cell information is the GAN cell information provided by the DRNC. The processing unit module 110 having obtained the GAN cell information is able to measure GAN cells according to the obtained GAN cell information. And, the processing unit module 110 is able to report a result of measuring the GAN cells to the SRNC according to the measurement result. Moreover, the processing unit module 110 is able to perform handover for a GAN cell according to the measurement report.

INDUSTRIAL APPLICABILITY

Accordingly, the present invention has the following effects.

First of all, a UE is able to smoothly perform handover between heterogeneous networks including a wireless communication network and a wireless LAN.

Secondly, generation of overhead of radio signaling can be reduced.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for performing a handover between heterogeneous networks at a first mobile communication network node, the method comprising:
   receiving information from a mobile station (MS) that includes an indication that the MS can access a generic access network (GAN);
   transmitting a first message to a second mobile communication network node based on the information;
   receiving a second message from the second mobile communication network node in response to the first message, wherein the second message includes at least one generic access network (GAN) cell information; and
   transmitting the at least one GAN cell information to the MS,
      wherein the first message is a radio link setup request message or a radio link additional request message,
      wherein the second message is a radio link setup response message or a radio link additional response message,
      wherein the at least one GAN cell information is transmitted through a neighboring GSM cell information element (IE), a neighboring GAN cell information IE, or a non-critical extension part included in the radio link setup response message, and wherein neighboring GSM cell information IE includes an indication that the at least one cell is a GAN cell if the information is transmitted through the neighboring GSM cell information IE.

2. The method of claim 1, further comprising:
receiving a measurement report from the MS that includes information related to a first cell of the at least one cell that has a highest reception power; and
transmitting a message to the MS after receiving the measurement report, wherein the message commands the MS to perform the handover to the first cell.

3. The method of claim 1, wherein the second mobile communication network node is a drift radio network controller (DRNC).

4. The method of claim 1, wherein the first message includes an indication that the MS or the first mobile communication network node can access the wireless GAN.

5. A method for performing a handover between heterogeneous networks at a first mobile communication network node, the method comprising:
receiving a first message from a second mobile communication network node;
transmitting a second message to the second mobile communication network node in response to the first message, wherein the second message includes at least one generic access network (GAN) cell information; and
transmitting the at least one GAN cell information to a mobile station (MS),
wherein the first message is a radio link setup request message or a radio link additional request message,
wherein the second message is a radio link setup response message or a radio link additional response message, and
wherein the at least one GAN cell information is transmitted through a neighboring GSM cell information element (IE), a neighboring GAN cell information IE, or a non-critical extension part included in the radio link setup response message, wherein the first message includes an indication that the MS or the second mobile communication network node can access the wireless GAN, and wherein neighboring GSM cell information IE includes an indication that the at least one cell is a GAN cell if the information is transmitted through the neighboring GSM cell information IE.

6. The method of claim 5, wherein the second mobile communication network node is a serving radio network controller (SRNC).

* * * * *